US009250653B2

(12) United States Patent
Tsang

(10) Patent No.: US 9,250,653 B2
(45) Date of Patent: Feb. 2, 2016

(54) CAPTURING, PROCESSING, AND RECONSTRUCTING AUDIO AND VIDEO CONTENT OF MOBILE DEVICES

(71) Applicant: Peter Wai Ming Tsang, Hong Kong (CN)

(72) Inventor: Peter Wai Ming Tsang, Hong Kong (CN)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 221 days.

(21) Appl. No.: 13/630,443

(22) Filed: Sep. 28, 2012

(65) Prior Publication Data

US 2014/0092259 A1 Apr. 3, 2014

(51) Int. Cl.
*G06F 1/16* (2006.01)
*H04N 5/235* (2006.01)
*H04N 5/225* (2006.01)
*H04N 9/04* (2006.01)
*H04N 21/41* (2011.01)

(52) U.S. Cl.
CPC ............ *G06F 1/1632* (2013.01); *H04N 5/2254* (2013.01); *H04N 5/2256* (2013.01); *H04N 5/2354* (2013.01); *H04N 9/045* (2013.01); *H04N 21/4126* (2013.01)

(58) Field of Classification Search
None
See application file for complete search history.

(56) References Cited

U.S. PATENT DOCUMENTS

| | | | |
|---|---|---|---|
| 7,161,614 B1 | 1/2007 | Yamashita et al. | |
| 7,254,265 B2 | 8/2007 | Naske et al. | |
| 7,551,770 B2 | 6/2009 | Harman | |
| 8,711,284 B2* | 4/2014 | Chang et al. | 348/552 |
| 2002/0191841 A1* | 12/2002 | Harman | 382/154 |
| 2006/0227224 A1* | 10/2006 | Kawata et al. | 348/231.99 |
| 2011/0085082 A1* | 4/2011 | Jing et al. | 348/552 |
| 2011/0249820 A1 | 10/2011 | Tsang | |
| 2012/0086705 A1 | 4/2012 | Tsang | |
| 2012/0157209 A1* | 6/2012 | Yamashita | 463/39 |
| 2012/0314021 A1 | 12/2012 | Tsang | |
| 2013/0063662 A1* | 3/2013 | Lee | 348/552 |
| 2013/0162515 A1* | 6/2013 | Prociw et al. | 345/156 |
| 2013/0215292 A1* | 8/2013 | Reichelt | 348/239 |

* cited by examiner

*Primary Examiner* — Shahbaz Nazrul
(74) *Attorney, Agent, or Firm* — Amin, Turocy & Watson, LLP

(57) ABSTRACT

Techniques for presenting content provided by a mobile device on a second communication device are presented. A content enhancer component (CEC) connects via a wired or wireless communication connection to the second communication device to communicate content to the second communication device, which has a larger display than or superior audio to the mobile device. The CEC captures content and interaction between the user and mobile device in a capture region of the CEC. The CEC reconstructs the content and the user-related interaction for presentation on the second communication device. The second communication device can have a 2-D or 3-D display. If a 3-D display, the CEC can convert captured video content into a 3-D format to provide 3-D perception when content is displayed on the second communication device. The captured audio signal can be processed to provide an enhanced stereo or 3-D sound effect.

22 Claims, 11 Drawing Sheets

CAPTURING, PROCESSING, AND RECONSTRUCTING AUDIO AND VIDEO CONTENT OF MOBILE DEVICES

TECHNICAL FIELD

The subject disclosure relates generally to media processing, and in particular, to capturing, processing, and reconstructing audio and video content of mobile devices.

BACKGROUND

Today, numerous people may use one or more mobile devices in their everyday life. While mobile devices can be convenient to carry and access in an outdoor environment, the display screen normally can be too small to provide a desirable level of comfort and impact to the mobile device users, and the audio sound from speakers on mobile devices can be of relatively lower quality as compared to the audio sound provided by, for example, home video or audio equipment.

One solution that can be used to try to remedy such video and audio shortcomings of mobile devices can be to connect, through use of a communication cable, the video and audio output of a mobile device to a larger display, such as a liquid crystal display (LCD) monitor, which can have relatively higher quality audio capabilities as compared to the mobile device, and can be equipped with both audio and video inputs for use in creating a communication link with the mobile device. The communication link can be in the form of a set of electrical cables, or a means of data transmission through an Internet communication channel. However, such straightforward methods for connecting the mobile device with the larger display can have a number of disadvantages. One disadvantage can be that the mobile device may not have a video and/or an audio output that would enable the mobile device to interface with the larger display via an external communication link. Another disadvantage can be that, when a user activates a command (e.g., to play an electronic game) to the mobile device through physical buttons and/or on-screen touch, the user's attention may be diverted from the larger display device to the smaller display screen and/or controls of the mobile device. This can defeat the purpose of adopting the larger display device for presenting video and audio content associated with the mobile device as the user may not be watching the larger display when accessing the buttons or controls on the mobile device. This problem can be even larger in electronic game playing on the mobile device, while using the larger display device, as it can be desirable for the user's attention to be focused on the control mechanisms (e.g., buttons, controls, touch-screen control mechanisms, etc.) on the mobile device while playing the electronic game.

Still another drawback with conventional techniques can be that it may be unlikely that a single solution (e.g., a communication cable) can be adapted to different kinds of mobile devices. As such, a different connection device may have to be used for each class of mobile device(s) that are sharing identical audio and video interfaces. Yet another deficiency with conventional techniques can be that the video signal output by the mobile device may be generally represented in a limiting visual format, which can undesirably limit the visual impact when the video signal of the mobile device is presented on the larger display device when that larger display device does not suffer the same limitations as the limiting visual format of the mobile device.

Another deficiency of conventional techniques can be that the audio output of the mobile device may be in mono. This can limit the auditory impact when the audio signal of the mobile device is presented on a multi-channel sound system (e.g., associated with the larger display device). Still another deficiency of the conventional techniques can be that, even if the format of the audio signal of the mobile device is in stereo, the spatial effect may not be strong enough when played with a higher-fidelity external audio system (e.g., associated with the larger display device).

The above-described description is merely intended to provide a contextual overview of generating and displaying digital holograms, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

Disclosed herein is a system comprising at least one memory that stores computer executable components, and at least one processor that facilitates execution of the computer executable components stored in the at least one memory. The computer executable components comprise a capture component that captures video content presented by a first communication device and visual information relating to interaction between a user and the first communication device in relation to the video content. The computer executable components also include a content enhancer component that reconstructs at least a portion of the video content, and reconstructs the visual information, to facilitate generation of reconstructed video content, comprising at least the portion of the video content, and reconstructed visual information relating to the interaction between the user and the first communication device, to facilitate presentation of the reconstructed video content and the reconstructed visual information by a second communication device.

Also disclosed herein is a method that includes capturing, by a system including a processor, video content provided by a mobile communication device and visual information relating to interaction between a user and the mobile communication device in relation to the video content. The method also includes reconstructing, by the system, the video content and the visual information to generate reconstructed video content and reconstructed visual information relating to the interaction between the user and the mobile communication device to facilitate providing the reconstructed video content and the reconstructed visual information to a different communication device.

Further disclosed herein is a non-transitory computer readable storage medium comprising computer executable instructions that, in response to execution, cause a system including a processor to perform operations. The operations include obtaining video content provided by a first communication device and visual information relating to interaction between a user and the first communication device in relation to the video content. The operations also include reconstructing the video content and the visual information to generate reconstructed video content and reconstructed visual information relating to the interaction between the user and the first communication device to facilitate providing the reconstructed video content and the reconstructed visual information to a second communication device.

The disclosed subject matter also includes a system comprising means for capturing video content provided by a mobile communication device and visual information relating to interaction between a user and the mobile communication device in relation to the video content. The system also includes means for reconstructing the video content and the visual information to generate reconstructed video content and associated visual information relating to the interaction between the user and the mobile communication device to facilitate providing the reconstructed video content and the associated visual information to a different communication device.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
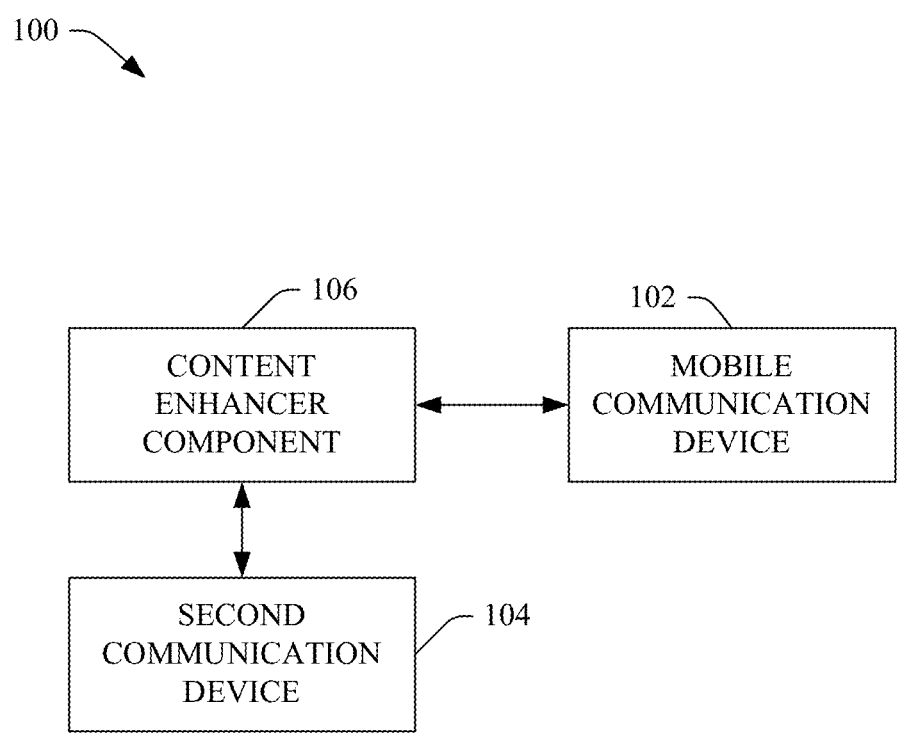
FIG. 1 illustrates a block diagram of an example system that can capture, process, and reconstruct video content, visual information relating to user-related interaction, and audio content associated with a mobile communication device for presentation on a second communication device, in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Today, numerous people may use one or more mobile devices in their everyday life. While mobile devices can be convenient to carry and access in an outdoor environment, the display screen normally can be too small to provide a desirable level of comfort and impact to the mobile device users, and the audio sound from speakers on mobile devices can be of relatively lower quality as compared to the audio sound provided by, for example, home video or audio equipment.

One conventional technique that can be used to try to remedy such video and audio shortcomings of mobile devices can be to connect, through use of a communication cable, the video and audio output of a mobile device to a larger display, such as a liquid crystal display (LCD) monitor, which can have relatively higher quality audio capabilities as compared to the mobile device, and can be equipped with both audio and video inputs for use in creating a communication link with the mobile device. The cables or devices that can be used to connect the mobile device to the larger display can include, for example, Digital Living Network Alliance (DLNA) compliant devices. Another conventional technique that can be used to try to remedy such video and audio shortcomings can be to communicatively connect the mobile device and the larger display using network communication via Wi-Fi or other wireless connection (e.g., using a wireless audiovisual streaming device).

However, such conventional techniques to remedy such video and audio shortcomings of mobile devices can have a number of disadvantages. One disadvantage can be that these conventional techniques can only be used with mobile devices that are equipped with the audiovisual electrical interface or network access, using software programs and/or hardware devices, to deliver the audiovisual information from the mobile device to the larger display device. For instance, the mobile device may not have a video and/or an audio output that would enable the mobile device to interface with the larger display via an external communication link.

Another disadvantage of such conventional techniques can be that they do not capture the interaction between the user and the mobile device. As a result, when a user activates a command (e.g., to play a song, play an electronic game, play a video, etc.) to the mobile device through physical buttons and/or on-screen touch, the user's attention may be diverted from the larger display device to the smaller display screen and/or controls of the mobile device. This can defeat the purpose of adopting the larger display device for presenting video and audio content associated with the mobile device as the user may not be watching the larger display when accessing the buttons or controls on the mobile device. This problem can be even larger in electronic game playing on the mobile device, while attempting to use the larger display device, as it can be desirable for the user's attention to be focused on the control mechanisms (e.g., buttons, controls, touch-screen control mechanisms, etc.) on the mobile device while playing the electronic game.

Still another drawback with conventional techniques can be that it may be unlikely that a single solution (e.g., a communication cable) can be adapted to different kinds of mobile devices. As such, a different connection device may have to be used for each class of mobile device(s) that are sharing the same audio and video interfaces. Yet another deficiency with conventional techniques can be that the video signal output by the mobile device may be generally represented in a limiting visual format, such as two-dimensional (2-D) format, which may undesirably limit the visual impact when the video signal of the mobile device is presented on the larger display device when that larger display device does not suffer the same limitations as the limiting visual format of the mobile device. For example, the larger display device can be a three-dimensional (3-D) display device that can display video content in 3-D format, while the mobile device is only able to present video content in 2-D format.

Another deficiency of conventional techniques can be that the audio output of the mobile device may be in mono. This can limit the auditory impact when the audio signal of the mobile device is presented on a multi-channel sound system (e.g., associated with the larger display device). Still another deficiency of the conventional techniques can be that, even if the format of the audio signal of the mobile device is in stereo, the spatial effect of that audio signal may not be strong or significant enough when played with a higher-fidelity external audio system (e.g., associated with the larger display device).

To that end, techniques for capturing, processing, and reconstructing video and audio content of a mobile communication device for presentation on a second communication device (e.g., a larger display device) are presented. A content enhancer component can connect via a wired or wireless communication connection to the second communication device to communicate video or audio content to the second communication device. The second communication device can have a larger display screen, superior video quality, and/or superior audio quality than that of the mobile communication device (e.g., mobile phone, electronic tablet, portable electronic gaming device, etc.), and/or can have a projector component that can project the video content onto a projection screen that can be larger than the display screen of the mobile communication device.

The content enhancer component can include a capture region, wherein the mobile communication device can be placed. The content enhancer component can include one or more capture components (e.g., video and/or audio capture components) that can capture video content and audio content that can be presented (e.g., displayed, emitted, provided, etc.) by the mobile communication device, for example, while the mobile communication device is situated within or in proximity to the capture region. The capture component(s) also can capture visual information relating to the interaction between a user and the mobile communication device while the mobile communication device is within or in proximity to the capture region.

In some implementations, the capture component(s) can capture the video content, audio content, and/or user-related interaction (e.g., user activity associated with the mobile communication device) via wireless means, such as a camera, a microphone, or a wireless communication connection (e.g., Bluetooth, near field communication (NFC) technology, Wi-Fi, local area network (LAN) technology, etc.). For instance, the capture component can include one or more microphones that can capture audio signals emitted from one or more speakers of the mobile communication device. The capture component also can include a camera that can capture visual information displayed by the display screen of the mobile communication device and visual information relating to the interaction between the user and the mobile communication device. By capturing the visual information relating to the user-related interaction, the content enhancer component can enable a user to observe such user-related interaction on the second communication device (e.g., the second larger display) without the need for the user to focus the user's attention directly on the mobile communication device. That is, the user does not need to divert attention from the display screen of the second communication device to the buttons, controls, display screen (e.g., touch screen display), etc., of mobile communication device when the user is interacting with the buttons, controls, display screen, etc., of mobile communication device. This can be particularly suitable for playing electronic games, and in applications where frequent interaction between the user and the mobile communication device can be desired.

In other implementations, the content enhancer component can capture or obtain video or audio content being presented by the mobile communication device via a wired connection (e.g., a communication cable) between video or audio outputs of the mobile communication device and video or audio inputs of the content enhancer component and/or the second communication device. For instance, if the mobile communication device is equipped with an electrical video output, the content enhancer component can obtain the video signal from the mobile communication device with a video cable equipped with a physical interface that is compatible with the electrical video output of the mobile communication device and the electrical video input of the content enhancer component and/or the second communication device. If the mobile communication device has an electrical audio output, the content enhancer component can obtain the audio signal from the mobile communication device with an audio cable equipped with a physical interface that is compatible with the electrical audio output of the mobile communication device and an electrical video input of the content enhancer component and/or the second communication device.

The content enhancer component can process the captured content and/or user-related interaction (e.g., user activity associated with the mobile communication device), and can reconstruct the content and the user-related interaction associated with (e.g., content presented or originated by, user-related interaction obtained in relation to) the mobile communication device for presentation on the second communication device. For example, the content enhancer component can reconstruct the video content and/or the visual information relating to the interaction of the user with the mobile communication device (e.g., the user's manipulation of buttons, controls, interfaces, etc., on the mobile communication device) and can provide the reconstructed video content and visual information relating to user-related interaction for display on the display screen of the second communication device, and can reconstruct the audio content and provide the reconstructed audio content for presentation of the reconstructed audio content via an audio interface of the second communication device.

In accordance with various implementations, the second communication device can have a 2-D or 3-D display. If the second communication device includes a 3-D display, as desired, the content enhancer component can convert (e.g., automatically convert) video content captured or obtained from mobile communication device into a 3-D format to provide 3-D perception when the video content is displayed on the 3-D display of the second communication device. For example, if the 3-D display is a stereoscopic, autostereoscopic, or other multi-view 3-D format display, the content enhancer component can convert (e.g., automatically convert) video content that is captured or obtained from a mobile communication device into a 3-D stereoscopic, 3-D autostereoscopic, or other multi-view 3-D format display format to provide 3-D perception when the video content is displayed on the 3-D display of the second communication device.

With regard to the audio signal obtained via wireless or wired means from the mobile communication device, the content enhancer component can process the audio signal, as desired, and the processed audio signal can be played through an audio system comprising of amplifiers and loudspeakers, which can be connected via wire or wireless channels, of the content enhancer component and/or the second communication device. In some implementations, the content enhancer component can process the audio signal captured or obtained from the mobile communication device to generate and provide an enhanced stereo or a 3-D audio signal or sound effect (e.g., enhanced audio signal having 3-D perception) for presentation by the second communication device.

FIG. 1 illustrates a block diagram of an example system 100 that can capture, process, and reconstruct video content, visual information relating to user-related interaction, and audio content associated with a mobile communication device for presentation on a second communication device (e.g., a larger display device), in accordance with various aspects and embodiments of the disclosed subject matter. In an aspect, the system 100 can include a mobile communication device 102 that can present video and audio content to a user via a display screen and speakers of the mobile communication device 102. The mobile communication device 102 can be, for example, a mobile phone, an electronic tablet, a portable electronic gaming device, etc.

The system 100 also can contain a second communication device 104 that can present video and audio content to the user via a display screen and speakers of the second communication device 104. The second communication device 104 can have a display screen that can be larger in size and/or can have otherwise have superior quality and functionality than the display screen of the mobile communication device 102. In accordance with various implementations, the second communication device can comprise a 2-D display screen(s) or a 3-D display screen(s), as more fully disclosed herein. The second communication device 104 also can have audio components (e.g., amplifier(s), speakers, audio processor components, etc.) that can provide superior audio quality and functionality than the audio components of the mobile communication device 102.

The limitations of the video and audio quality provided by the mobile communication device 102, as described herein, may impair the experience of the user when perceiving content presented by the mobile communication device 102. The system 100 can include a content enhancer component 106 that can provide the user with an enhanced experience of video and audio content provided by the mobile communication device 102 to facilitate overcoming the impairment of the experience of the user when perceiving content presented on the mobile communication device 102.

The content enhancer component 106 can be associated with (e.g., communicatively connected to) the mobile communication device 102 and the second communication device 104. The content enhancer component 106 can obtain (e.g., capture, receive, etc.) video and audio content from the mobile communication device 102, process and reconstruct the content, and provide that processed and reconstructed content to the second communication device 104 for presentation on the second communication device 104. As more fully described herein, the content enhancer component 106 also can capture visual information relating to the interaction of the user with the mobile communication device 102, and process and reconstruct the visual information relating to the interaction of the user with the mobile communication device 102 with the video content, to facilitate providing the user an enhanced experience in relation to the content and/or associated application, game, video, etc.

The content enhancer component 106 can connect via a wireline or wireless communication connection to the second communication device 104 to communicate video or audio content to the second communication device 104. The second communication device 104 can have a larger display screen, better display quality, and/or superior audio quality than the display and/or audio features (e.g., video and/or audio related components) of the mobile communication device 102, and/or can have a projector component (not shown in FIG. 1) that can project the video content onto a projection screen that can be larger than the display screen of the mobile communication device 102.

The content enhancer component 106 can include a capture region (not shown in FIG. 1; e.g., as shown and described herein with regard to FIGS. 2 and 3), wherein the mobile communication device 102 can be placed. The content enhancer component 106 can include one or more capture components (e.g., video and/or audio capture components) (not shown in FIG. 1; e.g., as shown and described herein with regard to FIGS. 2 and 3) that can capture video content and audio content that can be presented (e.g., displayed, emitted, provided, etc.) by the mobile communication device 102, for example, while the mobile communication device 102 is situated within or in proximity to the capture region. The capture component(s) of the content enhancer component 106 also can capture the visual information relating to the interaction between the mobile communication device 102 and a user of the mobile communication device 102 while the mobile communication device 102 is within or in proximity to the capture region.

In some implementations, the capture component(s) of the content enhancer component 106 can capture the video content, audio content, and/or visual information relating to the user-related interaction (e.g., user activity associated with the mobile communication device) via wireless means, such as, for example, a camera(s), a microphone(s), or a wireless communication connection (e.g., Bluetooth, NFC technology, Wi-Fi, LAN technology, etc.). For instance, a capture component(s) of the content enhancer component 106 can include one or more microphones that can capture audio signals emitted from one or more speakers of the mobile communication device 102 while the mobile communication device 102 is in or at least within proximity to the capture region of the content enhancer component 106. The capture component(s) of the content enhancer component 106 also can include one or more cameras that can capture visual information displayed by the display screen of the mobile communication device 102 and/or visual information relating to the interaction between the user and the mobile communication device 102. By capturing the visual information relating to the user-related interaction, the content enhancer component 106 can enable a user to observe such user-related interaction on the second communication device 104 (e.g., the second larger display) without the need of diverting attention to or focusing the user's attention directly on the mobile communication device 102. That is, the user does not need to divert attention from the display screen of the second communication device 104 to the buttons, controls, display screen (e.g., touch screen display), etc., of mobile communication device 102 when the user is interacting with the buttons, controls, display screen, etc., of mobile communication device 102, as the user can perceive (e.g., view) the user's interaction with the mobile communication device 102 on the larger display screen of the second communication device 104. This can be particularly suitable for playing electronic games, and in applications where frequent interaction between the user and the mobile communication device can be desired.

In other implementations, the content enhancer component 106 can capture or obtain video or audio content being presented by the mobile communication device 102 via a wired connection (e.g., a communication cable) between video or audio outputs of the mobile communication device 102 and video or audio inputs of the content enhancer component 106 and/or the second communication device 104 (e.g., when the content enhancer component 106 and second communication device 104 are integrated). For instance, if the mobile communication device 102 is equipped with an electrical video output, the content enhancer component 106 can obtain the video signal from the mobile communication device 102 with a video cable equipped with a physical interface that is compatible with the electrical video output of the mobile communication device 102 and the electrical video input of the content enhancer component 106 and/or the second communication device 104. If the mobile communication device 102 has an electrical audio output, the content enhancer component 106 can obtain the audio signal from the mobile communication device 102 with an audio cable equipped with a physical interface that is compatible with the electrical audio output of the mobile communication device 102 and an electrical video input of the content enhancer component 106 and/or the second communication device 104.

The content enhancer component 106 can process the captured content and/or visual information relating to the user-related interaction (e.g., user activity associated with the mobile communication device 102), and can reconstruct the content and the visual information relating to the user-related interaction associated with (e.g., content presented or originated by, user-related interaction obtained in relation to) the mobile communication device 102 for presentation on the second communication device 104. For example, the content enhancer component 106 can reconstruct the video and/or audio content, and the visual information relating to the interaction of the user in relation to the mobile communication device 102, and can provide the reconstructed content and/or visual information relating to the user-related interaction for presentation by the second communication device 104, which can present the reconstructed video content and/or visual information relating to the interaction of the user with the mobile communication device 102 (e.g., the user's manipulation of buttons, controls, interfaces, etc., on the mobile communication device) on the larger display screen of the second communication device 104. The content enhancer component 106 also can reconstruct the audio content and can provide the reconstructed audio content for presentation of the reconstructed audio content via an audio interface of the second communication device 104.

In accordance with various implementations, the second communication device 104 can have a 2-D or 3-D display. The 2-D display screen of the second communication device 104 can be or can include, for example, a liquid crystal display (LCD), light-emitting diode (LED) display, a combination LCD/LED display, or other desired type of 2-D display screen. If the second communication device 104 includes a 3-D display, the content enhancer component 106 can convert (e.g., automatically convert) video content and/or visual information relating to user-related interaction captured or obtained from the mobile communication device 102 into a 3-D format to provide 3-D perception when the video content and/or visual information relating to user-related interaction is displayed on the 3-D display of the second communication device 104. For example, if the 3-D display of the second communication device 104 is a 3-D stereoscopic, 3-D autostereoscopic (e.g., lens free 3-D autostereoscopic), or other multi-view 3-D format display, the content enhancer component 106 can convert (e.g., automatically convert) video content and/or visual information relating to user-related interaction that is captured or obtained from the mobile communication device 102 into a 3-D stereoscopic, 3-D autostereoscopic, or other multi-view 3-D format display format to facilitate providing 3-D perception when the 3-D video content and/or 3-D visual information relating to user-related interaction is displayed on the 3-D display of the second communication device 104.

In some implementations, to convert a 2-D visual image to a 3-D visual image, the content enhancer component 106 can obtain or capture a 2-D visual image (including video content and associated visual information relating to user-related interaction) associated with the mobile communication device 102 and apply a low-pass filter (e.g., rectangular filter, Hamming filter, etc.) to the 2-D visual image. The content enhancer component 106 can create a set of multi-view visual images from the 2-D visual image by creating a plurality of copies of the visual image and applying an offset factor to each multi-view visual image. The content enhancer component 106 can integrate the set of multi-view visual images using a 2-D mask function in order to generate a 3-D visual image corresponding to the 2-D visual image.

In certain implementations, the content enhancer component 106 can generate and display a multiple view 3-D visual image (e.g., a 3-D holographic image) of one or more 2-D visual images (including video content and associated visual information relating to user-related interaction) obtained or captured in relation to the mobile communication device 102. The content enhancer component 106 can convert the 2-D visual information associated with the 2-D image(s) to facilitate generating a 3-D integrated image comprising various perspectives of a 3-D object scene. In accordance with various aspects, the content enhancer component 106 can use distortion morphing or transition morphing to facilitate generating one or more 2-D morphing images, based at least in part on the captured or obtained 2-D image(s), to reconstruct different perspectives of the 3-D object scene without having to capture or obtain such different perspectives. The content enhancer component 106 can integrate the sequence of 2-D images, including the generated 2-D morphing images, each representing a respective view of a portion (e.g., a frame or 3-D image) of the 3-D object scene, to form a 3-D integrated visual image of the 3-D object scene.

In certain implementations, the content enhancer component 106 can generate a depth map to facilitate converting a 2-D visual image to a 3-D visual image, such as a stereoscopic visual image. To facilitate generating the depth map, the content enhancer component 106 can perform certain operations. For instance, the content enhancer component 106 can identify objects within a 2-D visual image, and can respectively allocate identification tags to the objects. The content enhancer component 106 also can respectively allocate depth tags to the objects. The content enhancer component 106 further can determine and/or define respective outlines of each object.

In other implementations, the content enhancer component 106 can convert 2-D visual images to 3-D visual images displaying 2-D visual images and computed visual images. The content enhancer component 106 can generate computed visual images using an approximation variable that can represent a certain relationship between the 2-D visual images (e.g., the speed of motion across two 2-D visual images). The content enhancer component 106 can adjust (e.g., temporarily adjust) the approximation variable to a desired value to make a 2-D visual image and corresponding computed visual image more similar to facilitate compensating for a hard cut or a vertical motion effect that can be associated with certain types of 2-D content.

In still other implementations, the content enhancer component 106 can convert 2-D visual images to 3-D visual images by employing a field memory and storing a captured or obtained 2-D visual image in the field memory for each field, and detecting or identifying, for each portion (e.g., block, area) of a 2-D image, a motion vector that can correspond to movement between fields of the 2-D visual image and the direction of movement. The content enhancer component 106 can obtain (e.g., read) a delayed 2-D visual image from the field memory, wherein the delayed 2-D visual image can be delayed from the captured or obtained 2-D visual image by a certain delay (e.g., delayed by a certain number of fields) that can be identified or determined based on the motion vector for each portion. The content enhancer component 106 can provide as an output either a reference 2-D visual image or the delayed 2-D visual image as a first video signal (e.g., left-eye video signal) and provide as an output the other of the reference 2-D visual image or the delayed 2-D visual image as a second video signal (e.g., right-eye video signal) based at least in part on the direction of movement of the motion vector. The content enhancer component 106 can extract image features from a 2-D video image, can generate a depth map based at least in part on the amount of movement of the motion vector, and can generate other depth maps respectively based on respective aspects (e.g., contrast, high-frequency components, or other aspects) of the image features. The content enhancer component 106 can generate a composite depth map based on the first and other generated depth maps and a respective weighting for each of the first and other depth maps. The content enhancer component 106 can determine or calculate a parallax between the left-eye visual image and the right-eye visual image for each parallax area based on the composite depth map, and can correct the parallax for each parallax area based at least in part on the amount of movement of the motion vector, for example, by reducing the parallax by a parallax that can correspond to the amount of delay between the delayed visual image and the reference visual image. The content enhancer component 106 also can shift (e.g., horizontally shift) the right-eye visual image and the left-eye visual image based at least in part on the parallax after correction of the parallax. The shifted visual images can be displayed as a 3-D visual image converted from the captured or obtained 2-D visual image.

In some instances, for a variety of reasons, the visual quality of the video content obtained by the content enhancer component 106 via a wireline or wireless communication channel between the content enhancer component 106 and the mobile communication device 102 may be better than the visual quality of the video content captured from the mobile communication device 102 by the content enhancer component 106 (e.g., using a capture component). In some implementations, the content enhancer component 106 can utilize a capture component (e.g., one or more cameras) to capture video content presented by the mobile communication device 102 and capture visual information relating to the interaction between the user and the mobile communication device 102 in relation to the video content, and also can obtain such video content via a wireline or wireless communication link with the mobile communication device 102. To facilitate improving the presentation of the reconstructed video content on the second communication device 104, the content enhancer component 106 can integrate, blend, or selectively process (e.g., via masking) video content obtained via the communication link with the captured video content including the captured visual information relating to the interaction between the user and the mobile communication device 102.

For example, the content enhancer component 106 can integrate or blend the captured video content, and the captured visual information relating to the user-related interaction, and the video content obtained via the communication link to have the video content obtained via the communication link (e.g., the higher quality video content) predominate over or partially replace the captured video content, while still including or preserving the captured visual information relating to the interaction between the user and the mobile communication device 102. For instance, if the user interaction involves the user using a pointer means (e.g., a finger(s)) on the display screen of the mobile communication device 102, the content enhancer component 106 can process the video content such that the video content obtained via the communication link can be used in the portion of a video image that does not involve the user interaction, while the captured video content can be used for the portion of the video image that involves the user interaction. As another instance, the content enhancer component 106 can process the video content such that the video content obtained via the communication link (e.g., the higher quality video content) can be blended with and predominate over the captured video content, while still preserving the captured visual information relating to the user-related interaction in the reconstructed visual images.

In some implementations, if the user interaction involves the user using a pointer means (e.g., a finger(s)) on the display screen of the mobile communication device 102, the content enhancer component 106 can mask the portion of the captured visual image that does not involve the interaction between the user and the display screen of the mobile communication device 102, to remove that portion of the captured visual image that does not involve the interaction between the user and the display screen of the mobile communication device 102. The content enhancer component 106 can process the remaining portion of the captured visual image (which will include the user-interaction visual information) to integrate it with a portion of the video content obtained via the communication link that corresponds to the masked-off portion (e.g., a corresponding portion of the video content obtained via the communication link can replace the portion of the captured video content that was removed by the masking process in the visual image) to facilitate reconstructing the visual image with the video information of the user interaction, while providing improved video quality due to the partial use of the video content obtained via the communication link (e.g., the higher quality video content).

In certain implementations, the content enhancer component 106 can determine (e.g., dynamically or automatically) whether the video content obtained via the communication link has a better quality than, or has a sufficient level of improved quality over, the captured video content. Based at least in part on the result of such determination, the content enhancer component 106 can determine whether to integrate, blend, or selectively process the video content obtained via the communication link, the captured video content, and the captured visual information relating to the interaction between the user and the mobile communication device 102. For example, if the content enhancer component 106 determines that the quality of the video content obtained from the communication link has a sufficient level of improved quality over the captured video content, the content enhancer component 106 can determine that the video content obtained via the communication link, the captured video content, and the captured visual information relating to the interaction between the user and the mobile communication device 102, are to be integrated, blended, or selectively processed, as more fully disclosed herein. If the content enhancer component 106 determines that the quality of the video content obtained from the communication link does not have a sufficient level of improved quality over the captured video content, the content enhancer component 106 can determine that the video content obtained via the communication link can be disregarded (e.g., to facilitate saving computational resources, processing time, and/or power usage), and the captured video content, and the captured visual information relating to interaction between the user and the mobile communication device 102, can be processed and reconstructed for presentation on the second communication device 104.

With regard to the audio signal obtained via wireless or wired means from the mobile communication device 102, the content enhancer component 106 can process the audio signal, as desired, and the processed audio signal can be presented (e.g., played) through an audio system comprising of amplifiers and loudspeakers, which can be connected via wired or wireless channels, of the content enhancer component 106 and/or the second communication device 104. In some implementations, the content enhancer component 106 can process the audio signal captured or obtained from the mobile communication device 102 to generate and provide an enhanced stereo or a 3-D audio signal or sound effect (e.g., enhanced audio signal having 3-D perception) for presentation by the second communication device 104.

In some implementations, the content enhancer component 106 can enhance the audio signal captured or obtained from the audio content presented by the mobile communication device 102 to increase its spatial or 3-D effect when played on the audio system of the second communication device 104. For instance, the content enhancer component 106 can enhance the captured or obtained audio content to produce a spatial effect that can provide enhanced audio content that can have a 3-D sound perception. For example the content enhancer component 106 can generate a summation signal based at least in part on a sum of the left audio signal and the right audio signal of the captured or obtained audio signal. The content enhancer component 106 can generate an ambience signal based at least in part on the difference between the left audio signal and the right audio signal. The content enhancer component 106 can generate an enhanced audio signal (e.g., enhanced audio signal with a spatial effect, such as 3-D perception) based at least in part on the summation signal and the ambience signal, wherein the enhanced audio signal can include a channel pair comprising a left output audio signal and a right output audio signal, and can be based at least in part on a modulation of the ambience signal with a time-varying function.

The disclosed subject matter, by employing the content enhancer component 106 to capture or otherwise obtain video and audio content from, as well as user interaction with, a mobile communication device 102, process the video and audio content and/or the captured visual information relating to the user interaction with the mobile communication device 102, and reconstruct the processed video and audio content, and visual information relating to the user-related interaction, for display on a larger video display screen and presentation on a superior audio system, respectively, of the second communication device 104, can have a number of advantages over conventional technology and products. For instance, the disclosed subject matter does not require the mobile communication device 102 to have an electrical audiovisual interface in order for the disclosed subject matter to obtain the audio and video content from the mobile communication device 102. The disclosed subject matter can be used with virtually any type of mobile communication device 102. When the audiovisual information obtained or captured from the mobile communication device 102 is presented on the external equipment (e.g., second communication device 104 having a larger display screen and/or superior audio quality) of the disclosed subject matter, the interaction between the user (e.g., the pointing means, such as the fingers, of the user) and the mobile communication device 102 can be shown on the larger display screen of the second communication device 104. As such, the user does not have to divert the user's attention away from the larger display screen of the second communication device 104 to the buttons, controls, smaller display screen, etc., of the mobile communication device 102. The disclosed subject matter also can convert (e.g., automatically convert) the audio signal obtained from the mobile communication device 102 to an enhanced audio signal that can provide 3-D sound perception. The disclosed subject matter also can convert (e.g., automatically convert) the video signal (e.g., 2-D video signal) obtained from the mobile communication device 102 to an enhanced video signal that can provide 3-D video perception. In accordance with various implementations, the systems, methods, and techniques of the disclosed subject matter can be used, for example, for photo browsing, audiovisual entertainment, electronic game playing, audiovisual presentation with a large display screen or a projection screen, video conferencing, Internet browsing, or other desired purposes.

Figure 2:
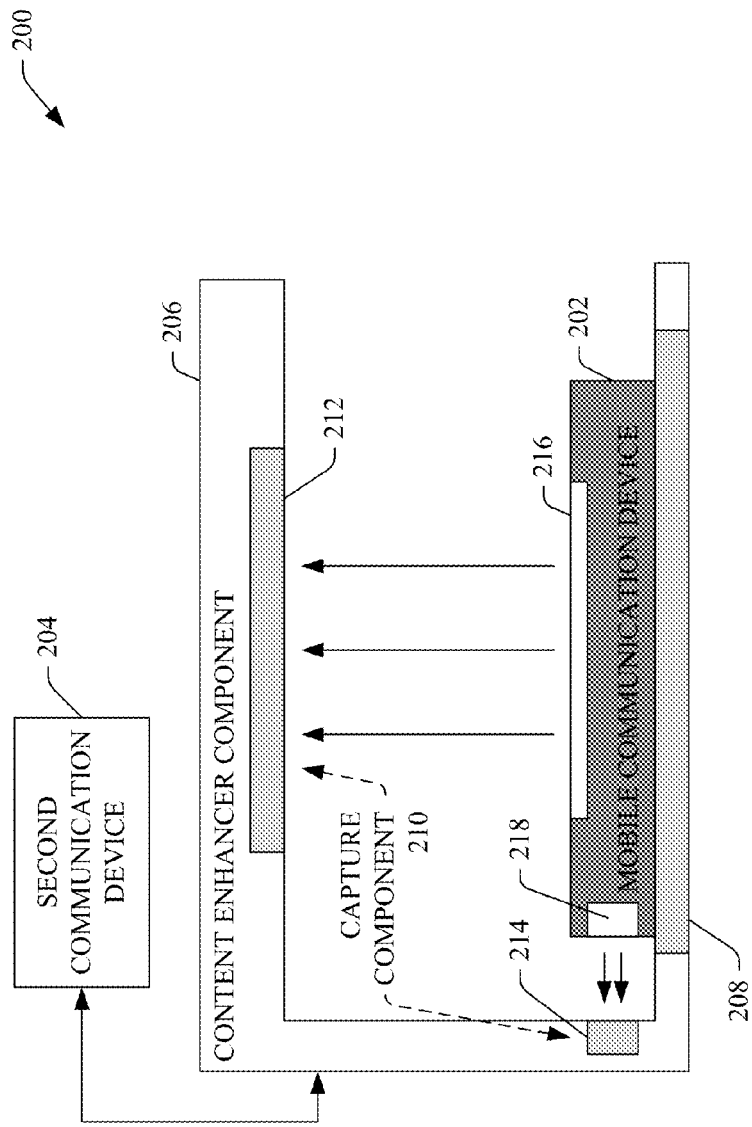
FIG. 2 depicts a diagram of an example system that can capture, process, and reconstruct video content, visual information relating to user-related interaction, and audio content associated with a mobile communication device for presentation on a second communication device, in accordance with various aspects and embodiments of the disclosed subject matter.

Turning to FIG. 2, depicted is a diagram of an example system 200 that can capture, process, and reconstruct video content, visual information relating to user-related interaction, and audio content associated with a mobile communication device for presentation on a second communication device (e.g., a larger display device), in accordance with various aspects and embodiments of the disclosed subject matter. The system 200 can include a mobile communication device 202 that can present video and audio content to a user. The system 200 also can include a second communication device 204 that can present video and audio content (e.g., reconstructed video and audio content) to the user via a display screen and speakers of the second communication device 204. The second communication device 204 can have a display screen that can be larger in size and/or can have otherwise have superior quality and functionality than the mobile communication device 202. The second communication device 204 also can have audio components (e.g., amplifier(s), speakers, audio processor components, etc.) that can provide superior audio quality and functionality than the mobile communication device 202. The system 200 can include a content enhancer component 206 that can provide the user with an enhanced experience of video and audio content provided by the mobile communication device 202 to facilitate overcoming impairment of the experience of the user when perceiving content presented by the mobile communication device 202. The mobile communication device 202, second communication device 204, and content enhancer component 206 each can be the same as or similar to, and/or can comprise the same or similar functionality or features as, respective components (e.g. respectively named components), such as more fully described herein.

The content enhancer component 206 can be associated with the mobile communication device 202, for example, by having the mobile communication device 202 positioned in (e.g., situated or placed in) a capture region 208 of the content enhancer component 206 and/or communicatively connected to the mobile communication device 202 via a wireline or wireless communication connection. The content enhancer component 206 also can be associated with (e.g., communicatively connected to) the second communication device 204 via a wireline or wireless communication connection.

The capture region 208 can be sized, shaped, and/or positioned on the content enhancer component 206 to facilitate capturing video and audio content presented by the mobile communication device 202. In some implementations, the capture region 208 can include a guide component that can include one or more guide lines (e.g., raised or displayed lines) or a guide frame (e.g., a raised or displayed frame, or a recessed region) in which the mobile communication device 202 can be placed in or on, or against which the mobile communication device 202 can be placed, to facilitate maintaining stability (e.g., positional stability) of the mobile communication device 202 while within the capture region 208.

The content enhancer component 206 can include a capture component 210 that can capture video content and/or audio content presented by (e.g., displayed or emitted by) the mobile communication device 202 while it is within or in proximity to the capture region 208. The capture component 210 can include a video capture component 212 that can capture video content presented by the mobile communication device 202 and interaction between a user and the mobile communication device 202, and an audio capture component 214 that can capture audio content presented by the mobile communication device 202, while the mobile communication device 202 is within or in proximity to the capture region 208.

The video capture component 212 can include one or more video capture sub-components, such as one or more cameras, that can capture video content displayed by a display screen 216 of the mobile communication device 202 and interaction between the user and the display screen 216 and/or another interface(s) (e.g., keyboard, controls, buttons, etc.) of the mobile communication device 202. The audio capture component 214 can include one or more audio sub-components, such as one or more audio microphones, that can capture audio content (e.g., audio sounds) emitted by one or more speakers 218 of the mobile communication device 202. In some implementations, the video capture component 212 and audio capture component 214 can capture or obtain the video content and audio content, respectively, from the mobile communication device 202 via a wireline or wireless communication channel(s) between the mobile communication device 202 and the capture component 210.

The content enhancer component 206 can process and reconstruct the video content, visual information relating to the user-related interaction, and audio content captured or obtained by the video capture component 212 and audio capture component 214, as more fully disclosed herein. The content enhancer component 206 can provide (e.g., transmit) the reconstructed video content, visual information relating to the user-related interaction, and audio content to the second communication device 204. The second communication device 204 can present the reconstructed video content, visual information relating to the user-related interaction, and audio content via its display screen (e.g., 2-D display screen, 3-D display screen) and audio system, respectively.

Figure 3:
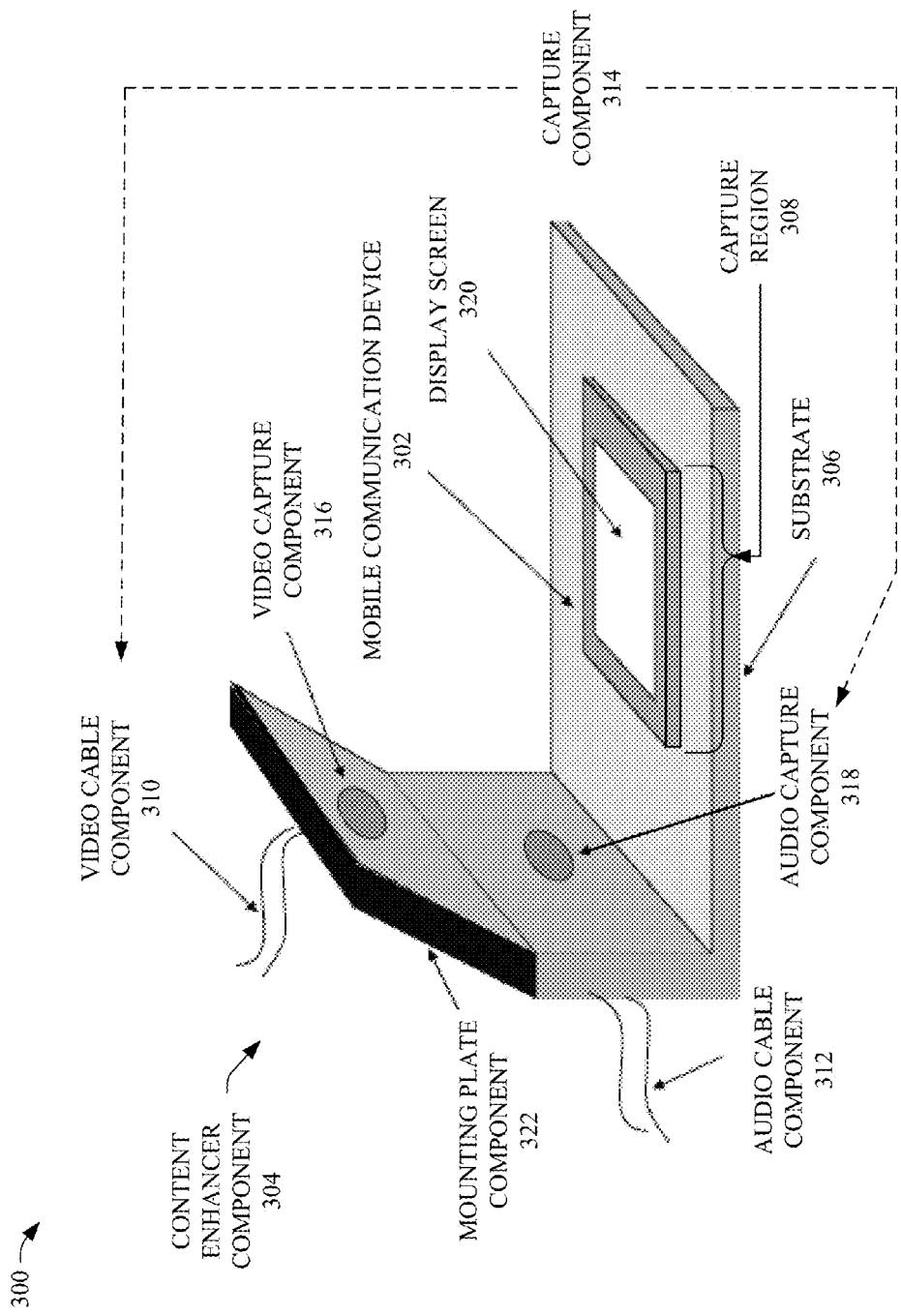
FIG. 3 illustrates an angled aerial diagram of an example system that can capture, process, and reconstruct video content, visual information relating to user-related interaction, and audio content associated with a mobile communication device to facilitate presentation of the reconstructed video, visual information relating to user-related interaction, and audio content on a second communication device, in accordance with various aspects and embodiments of the disclosed subject matter.

FIG. 3 illustrates an angled aerial diagram of an example system 300 that can capture, process, and reconstruct video content, visual information relating to user-related interaction, and audio content associated with a mobile communication device to facilitate presentation of the reconstructed video, visual information relating to user-related interaction, and audio content on a second communication device, in accordance with various aspects and embodiments of the disclosed subject matter. The system 300 can include can include a mobile communication device 302 that can present video and audio content to a user. The system 300 also can include a content enhancer component 304 that can provide the user with an enhanced experience of video and audio content provided by the mobile communication device 302 to facilitate overcoming the impairment of the experience of the user when perceiving content presented on the mobile communication device 302. The content enhancer component 304 can capture or obtain video content, visual information relating to the user-related interaction, and audio content from the mobile communication device 302, process and reconstruct such content and visual information relating to the user-related interaction, and provide the reconstructed content and visual information relating to the user-related interaction to a second communication device (not shown in FIG. 3; e.g., as depicted in FIGS. 1 and 2, and described herein). The mobile communication device 302, the content enhancer component 304, and the second communication device each can be the same as or similar to, and/or can comprise the same or similar functionality or features as, respective components (e.g. respectively named components), such as more fully described herein.

The content enhancer component 304 can be formed of one or more desired materials, including, for example, plastic, metal, wood, etc. The content enhancer component 304 can include a substrate component 306 that can be comprised of one or more desired materials. The substrate component 306 can include a capture region 308 that can be sized, shaped, and/or positioned on or in the substrate component 306 to facilitate accommodating the mobile communication device 302 and capturing video content, visual information relating to the user-related interaction, and audio content associated with (e.g., presented by or in relation to) the mobile communication device 302 when the mobile communication device 302 is within or in proximity to the capture region 308.

The content enhancer component 304 can be associated with the mobile communication device 302, for example, by having the mobile communication device 302 positioned in (e.g., situated or placed in) the capture region 308 and/or communicatively connected to the mobile communication device 302 via a wireline or wireless communication connection. The content enhancer component 304 also can be associated with (e.g., communicatively connected to) the second communication device via a wireline or wireless communication connection. In some implementations, the content enhancer component 304 can be communicatively connected to the second communication device via a video cable component 310 that can facilitate communicating video content (e.g., reconstructed video content and visual information relating to the user-related interaction) from the content enhancer component 304 to the second communication component. The content enhancer component 304 also can be communicatively connected to the second communication device via an audio cable component 312 that can facilitate communicating reconstructed audio content from the content enhancer component 304 to the second communication component.

The content enhancer component 304 can include a capture component 314 that can capture video content, visual information relating to the user-related interaction, and/or audio content associated with (e.g., displayed or emitted by or in relation to) the mobile communication device 302 while it is within or in proximity to the capture region 308. The capture component 314 can include a video capture component 316 that can capture video content presented by the mobile communication device 302 and visual information relating to the interaction between a user and the mobile communication device 302. The capture component 314 also can include an audio capture component 318 that can capture audio content presented by the mobile communication device 302, while the mobile communication device 302 is within or in proximity to the capture region 308.

The video capture component 316 can include one or more video capture sub-components, such as one or more cameras, that can capture video content displayed by a display screen 320 of the mobile communication device 302 and visual information relating to the interaction between the user and the display screen 320 and/or another interface(s) (e.g., keyboard, controls, buttons, etc.) of the mobile communication device 302 (e.g., by the user using a pointer means, such as the user's finger(s), to interact with the mobile communication device 302). In some implementations, the video capture component 316 can be positioned within or associated with a mounting plate component 322 of the content enhancer component 304. The audio capture component 318 can include one or more audio sub-components, such as one or more audio microphones, that can capture audio content (e.g., audio sounds) emitted by one or more speakers (not shown in FIG. 3; e.g., as shown in FIG. 2 and described herein) of the mobile communication device 302. In some implementations, the video capture component 316 and audio capture component 318 can capture or obtain the video content and audio content, respectively, from the mobile communication device 302 via a wireline or wireless communication channel(s) between the mobile communication device 302 and the capture component 314.

The content enhancer component 304 can process and reconstruct the video content, visual information relating to user-related interaction, and audio content captured or obtained by the video capture component 316 and audio capture component 318, as more fully disclosed herein. The content enhancer component 304 can provide (e.g., transmit) the reconstructed video content, visual information relating to user-related interaction, and audio content to the second communication device via the video cable component 310 and audio cable component 312, respectively. The second communication device can present the reconstructed video content, visual information relating to user-related interaction, and audio content via its display screen (e.g., 2-D display screen, 3-D display screen) and audio system, respectively.

Figure 4:
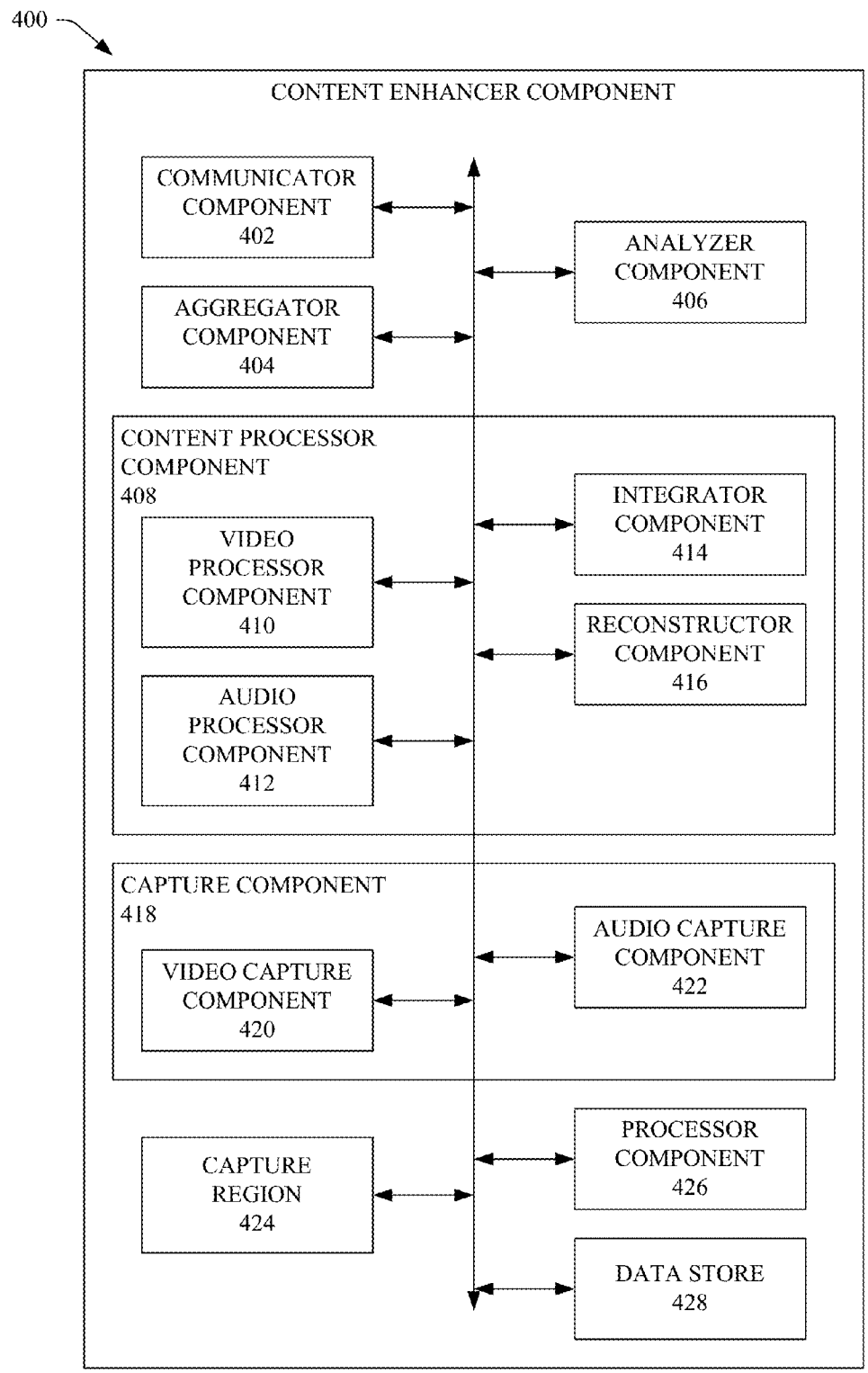
FIG. 4 illustrates a block diagram of a content enhancer component, in accordance with various aspects and implementations of the disclosed subject matter.

FIG. 4 illustrates a block diagram of a content enhancer component 400, in accordance with various aspects and implementations of the disclosed subject matter. The content enhancer component 400 can include a communicator component 402 that can be used to communicate (e.g., transmit, emit, receive, etc.) information, visual information (e.g., video content, visual information relating to user-related interaction with a mobile communication device), audio information (e.g., audio content), etc., between the content enhancer component 400 and other components (e.g., mobile communication device, second communication device (e.g., television, computer (e.g., desktop computer), video and/or audio projector, etc.). For example, the communicator component 402 can receive video content, visual information relating to user-related interaction, and audio content presented by, obtained from, or captured from the mobile communication device, and can transmit the corresponding reconstructed video content, visual information relating to user-related interaction, and audio content to the second communication device.

The content enhancer component 400 can comprise an aggregator component 404 that can aggregate data received (e.g., obtained, captured, etc.) from various entities (e.g., a mobile communication device, a second communication device, a processor component(s), a user interface(s), a data store(s), etc.). The aggregator component 404 can correlate respective items of data based at least in part on type of data (e.g., video content, visual information relating to user-related interaction with the mobile communication device, audio content, etc.), source of the data, time or date the data was generated or received, mobile communication device associated with an item of data, etc., to facilitate processing of the data (e.g., analyzing of the data by the analyzer component 406).

The analyzer component 406 can analyze data (e.g., video content captured from the mobile communication device, captured visual information relating to user-related interaction with the mobile communication device, captured audio content, etc.) to facilitate processing the respective data, and reconstructing the video content, visual information relating to user-related interaction, and audio content, wherein the content enhancer component 400 can provide the reconstructed video content, visual information relating to user-related interaction, and audio content to the second communication device for presentation by the second communication device. The analyzer component 406 can provide analysis results to, for example, the content processor component 408 or another component (e.g., processor component 426, data store 428, etc.).

Based at least in part on the results of this analysis, the content enhancer component 400 (e.g., using the content processor component 408) can process video content, including the visual information relating to user-related interaction, and audio content obtained from the mobile communication device, as more fully disclosed herein. The content processor component 408 can employ defined content processing algorithms (e.g., video processing, compression, and/or coding algorithms; audio processing, compression, and/or coding algorithms; etc.) to facilitate processing and/or reconstructing video content, including the visual information relating to user-related interaction, and audio content obtained from the mobile communication device.

The content processor component 408 can include a video processor component 410, an audio processor component 412, an integrator component 414, and/or a reconstructor component 416. The video processor component 410 can process, enhance, or convert video content, including the visual information relating to user-related interaction, obtained from the mobile communication device. In some implementations, if the destination (e.g., second communication device) of the video content is a 3-D display screen, as desired, the video processor component 410 can convert the 2-D video content obtained from the mobile communication device to 3-D video content, as more fully disclosed herein.

The audio processor component 412 can process, enhance, or convert audio content obtained from the mobile communication device. In some implementations, the audio processor component 412 can enhance or convert the audio content obtained from the mobile communication device to generate enhanced audio content that can include a spatial or 3-D effect, as more fully disclosed herein.

The integrator component 414 can be associated with or included in the video processor component 410 to facilitate processing the video content, and the visual information relating to user-related interaction, associated with the mobile communication device. The integrator component 414 can integrate video content, and the visual information relating to user-related interaction, captured from the mobile communication device, with corresponding video content obtained from the mobile communication device via a communication channel between the mobile communication device and content enhancer component 400, for example, when the corresponding video content obtained from the mobile communication device has sufficiently better quality than the captured video content, in accordance with one or more defined content processing criterion.

The reconstructor component 416 can reconstruct the video content, visual information relating to user-related interaction, and audio content, as otherwise processed by the content processor component 408, to generate reconstructed video and audio content. The content enhancer component 400 can provide the reconstructed video content, visual information relating to user-related interaction, and audio content to the second communication device for presentation by the second communication device.

The content enhancer component 400 can include a capture component 418, which can include a video capture component 420 and an audio capture component 422. The video capture component 420 can include one or more video capture sub-components (e.g., one or more cameras) that can be used to capture video content, and visual information relating to user-related interaction with the mobile communication device, associated with the mobile communication device when the mobile communication device is within or in proximity to a capture region 424 of the content enhancer component 400. The audio capture component 422 can include one or more audio capture sub-components (e.g., one or more microphones or audio sensors) that can be used to capture audio content presented (e.g., emitted) by the mobile communication device when the mobile communication device is within or in proximity to the capture region 424.

The content enhancer component 400 also can include a processor component 426 that can operate in conjunction with the other components (e.g., communicator component 402, aggregator component 404, analyzer component 406, content processor component 408, capture component 418, etc.) to facilitate performing the various functions of the content enhancer component 400. The processor component 426 can employ one or more processors, microprocessors, or controllers that can process data, such as video content, visual information relating to user-related interaction, audio content, data relating to parameters associated with the content enhancer component 400 and associated components, etc., to facilitate obtaining, processing, enhancing, and/or converting content associated with (e.g., presented by) a mobile communication device that is associated with (e.g., within the capture region 424 of) the content enhancer component 400 and visual information relating to user-related interaction with the mobile communication device; and can control data flow, content capture, etc., between the content enhancer component 400 and other components or devices (e.g., mobile communication device, second communication device, etc.) associated with the content enhancer component 400.

In yet another aspect, the content enhancer component 400 can contain a data store 428 that can store data structures (e.g., user data, metadata); code structure(s) (e.g., modules, objects, classes, procedures), commands, or instructions; information relating to video content, visual information relating to user-related interaction, and audio content, including information relating to obtaining, processing, enhancing, converting, or reconstructing content and visual information relating to user-related interaction; parameter data; algorithms (e.g., defined content processing algorithms, etc.); defined content processing criterion(s); and so on. In an aspect, the processor component 426 can be functionally coupled (e.g., through a memory bus) to the data store 428 in order to store and retrieve information desired to operate and/or confer functionality, at least in part, to the communicator component 402, aggregator component 404, analyzer component 406, content processor component 408, capture component 418, etc., and/or substantially any other operational aspects of the content enhancer component 400. It is to be appreciated and understood that the various components of the content enhancer component 400 can communicate information between each other and/or between other components associated with the content enhancer component 400 as desired to carry out operations of the content enhancer component 400. It is to be further appreciated and understood that respective components (e.g., communicator component 402, aggregator component 404, analyzer component 406, content processor component 408, capture component 418, etc.) of the content enhancer component 400 each can be a stand-alone unit, can be included within the content enhancer component 400 (as depicted), can be incorporated within another component of the content enhancer component 400 (e.g., content processor component 408, capture component 418, etc.) or component separate from the content enhancer component 400, and/or virtually any suitable combination thereof, as desired.

Figure 5:
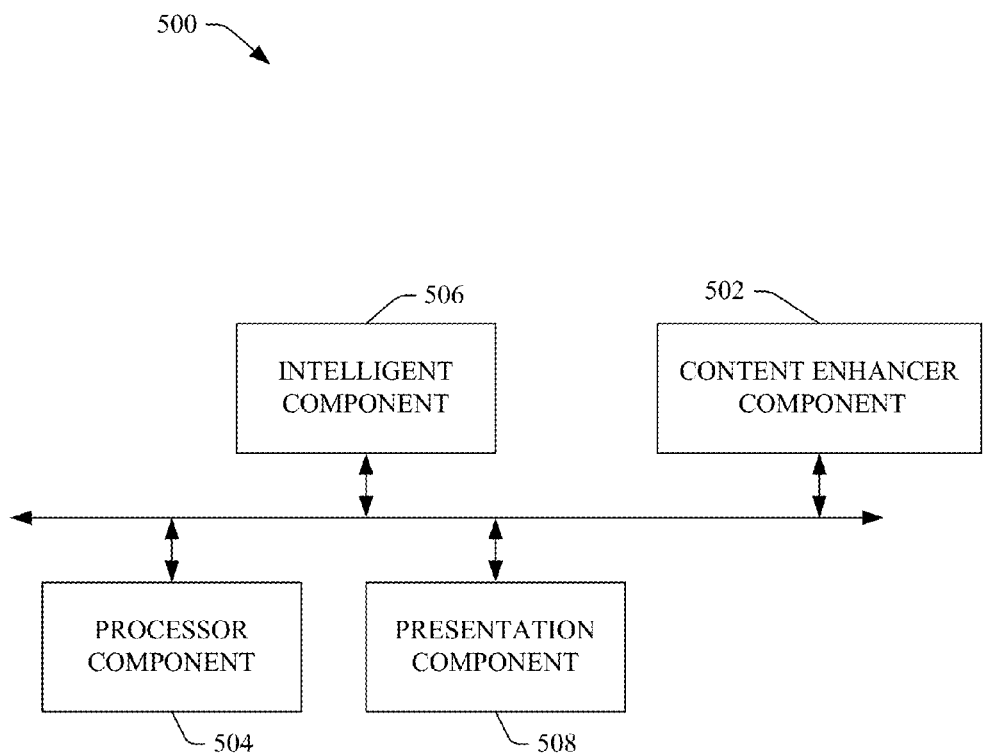
FIG. 5 presents a block diagram of a system that can employ intelligence to facilitate capturing, processing, and reconstructing video content, visual information relating to user-related interaction, and audio content associated with a mobile communication device to facilitate presentation of the reconstructed video, visual information relating to user-related interaction, and/or audio content on a second communication device, in accordance with an embodiment of the disclosed subject matter.

Referring to FIG. 5, depicted is a block diagram of a system 500 that can employ intelligence to facilitate capturing, processing, and reconstructing video content, visual information relating to user-related interaction, and audio content associated with a mobile communication device to facilitate presentation of the reconstructed video, visual information relating to user-related interaction, and audio content on a second communication device, in accordance with various aspects and embodiments of the disclosed subject matter. The system 500 can be employed by a content enhancer component to intelligently control the capturing, processing, and reconstructing of video content, visual information relating to user-related interaction, and audio content associated with the mobile communication device that is associated with the content enhancer component.

The system 500 can include a content enhancer component 502 that can desirably (e.g., intelligently) control capturing, processing, and reconstructing video content, visual information relating to user-related interaction, and audio content associated with the mobile communication device that is associated with the content enhancer component, as more fully disclosed herein. It is to be appreciated that the content enhancer component 502 can be the same or similar as respective components (e.g., respectively named components), and/or can contain the same or similar functionality as respective components, as more fully described herein.

The system 500 can further include a processor component 504 that can be associated with (e.g., communicatively connected to) the content enhancer component 502 and/or other components (e.g., components of system 500) via a bus. In accordance with an embodiment of the disclosed subject matter, the processor component 504 can be an applications processor(s) that can manage communications and run applications. For example, the processor component 504 can be a processor that can be utilized by a computer, mobile computing device, or other electronic computing device. The processor component 504 can generate commands in order to facilitate controlling the capturing, processing, and reconstructing of video content and audio content associated with the mobile communication device that is associated with the content enhancer component 502, modifying parameters associated with the content enhancer component 502, etc.

The system 500 also can include an intelligent component 506 that can be associated with (e.g., communicatively connected to) the content enhancer component 502, the processor component 504, and/or other components associated with system 500 to facilitate analyzing data, such as current and/or historical information, and, based at least in part on such information, can make an inference(s) and/or a determination(s) regarding, for example, whether to integrate captured video content and visual information relating to user-related interaction with corresponding video content obtained by other means from the mobile communication device; whether to convert, and/or a type of conversion of, content from one format to another format (e.g., a conversion of video content from 2-D to 3-D, a conversion of audio content to include a spatial effect, etc.); setting of parameters associated with the content enhancer component 502 and associated components, etc. For example, based in part on current and/or historical evidence, the intelligent component 506 can infer that integrating captured video content and visual information relating to user-related interaction with corresponding video content obtained by other means from the mobile communication device is desirable to facilitate improving the video quality of the reconstructed video content provided to the second communication device, while preserving the visual information relating to the user-related interaction with the mobile communication device.

In an aspect, the intelligent component 506 can communicate information related to the inferences and/or determinations to the content enhancer component 502. Based at least in part on the inference(s) or determination(s) with respect to such data by the intelligent component 506, the content enhancer component 502 can take (e.g., automatically or dynamically take) one or more actions to facilitate intelligently capturing, processing, and reconstructing video content and audio content associated with the mobile communication device, etc.

It is to be understood that the intelligent component 506 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 500 also can include a presentation component 508, which can be connected with the processor component 504. The presentation component 508 can provide various types of user interfaces to facilitate interaction between a user and any component coupled to the processor component 504. As depicted, the presentation component 508 is a separate entity that can be utilized with the processor component 504 and associated components. However, it is to be appreciated that the presentation component 508 and/or similar view components can be incorporated into the processor component 504 and/or a stand-alone unit. The presentation component 508 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 504.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 6-9 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Figure 6:
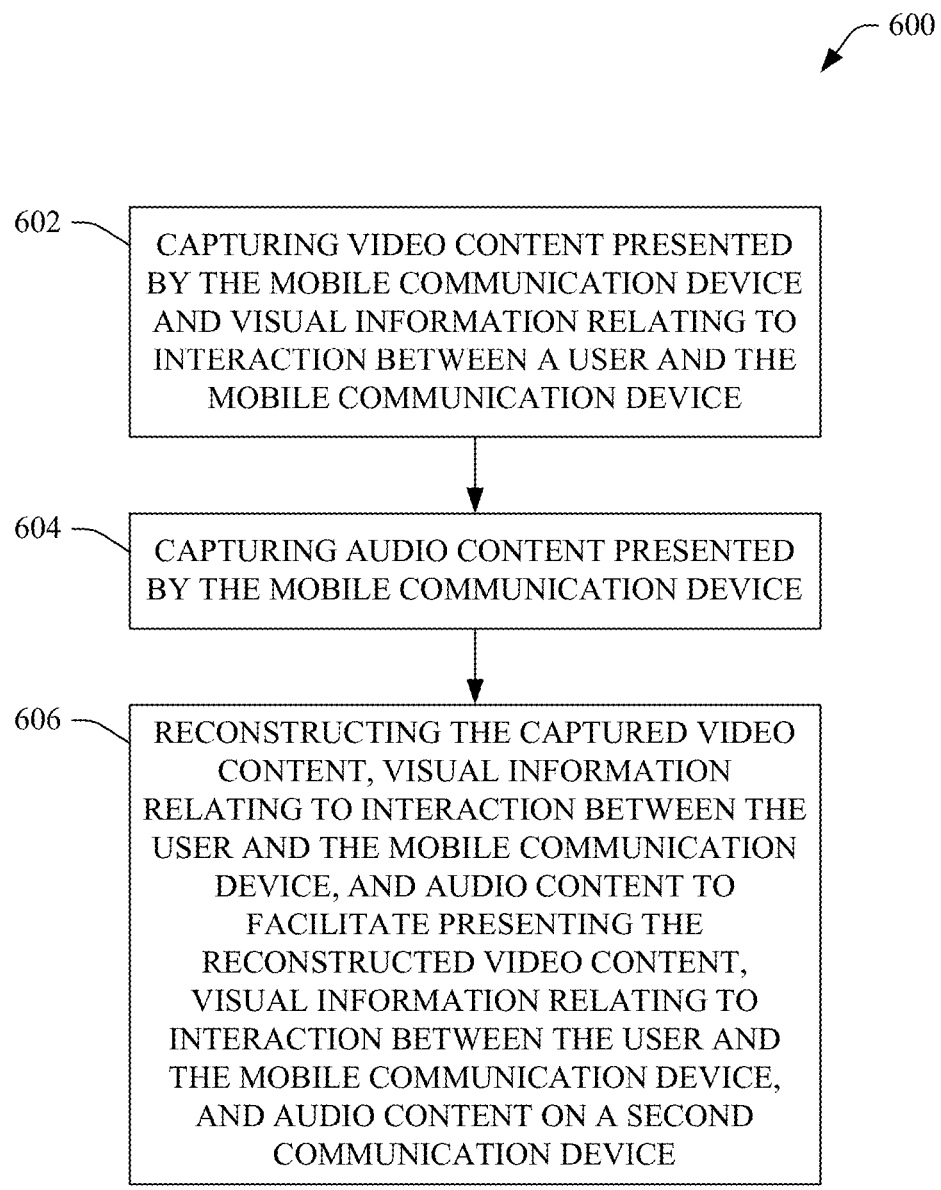
FIG. 6 illustrates a flow diagram of an example method for capturing, processing, and reconstructing video content, visual information relating to user interaction, and audio content associated with a mobile communication device to facilitate presenting the reconstructed video content, visual information, and audio content on a second communication device (e.g., a larger display device), in accordance with various embodiments and aspects of the disclosed subject matter.

Referring to FIG. 6, illustrated is a flow diagram of an example method 600 for capturing, processing, and reconstructing video content, visual information relating to user interaction, and audio content associated with a mobile communication device to facilitate presenting the reconstructed video content, visual information, and audio content on a second communication device (e.g., a larger display device), in accordance with various embodiments and aspects of the disclosed subject matter. At 602, video content presented by the mobile communication device and visual information relating to interaction between a user and the mobile communication device can be captured. While the mobile communication device is within or in proximity to a capture region of the content enhancer component, the content enhancer component can capture the video content presented by a mobile communication device and the visual information relating to interaction between the user and the mobile communication device, as more fully disclosed herein.

At 604, audio content presented by the mobile communication device can be captured. While the mobile communication device is within or in proximity to the capture region of the content enhancer component, the content enhancer component can capture the audio content presented by (e.g., emitted or projected by) the mobile communication device, as more fully disclosed herein.

At 606, the captured video content, visual information relating to interaction between the user and the mobile communication device, and audio content can be reconstructed to facilitate presenting the reconstructed video content, visual information relating to interaction between the user and the mobile communication device, and audio content on a second communication device. The content enhancer component can process the captured video content and the visual information relating to interaction between the user and the mobile communication device to enhance and/or reconstruct the captured video content and the visual information relating to interaction between the user and the mobile communication device. In some implementations, the content enhancer component can enhance the video content and/or the visual information relating to the user-related interaction by improving the video quality of such video content and visual information and/or converting such video content and visual information to 3-D video content based at least in part on a desired 3-D format, as disclosed herein.

The content enhancer component can process the captured audio content to enhance and/or reconstruct the captured audio content. In some implementations, the content enhancer component can enhance the audio content by improving the audio quality of the audio content and/or converting the audio content to produce a spatial effect that can have 3-D perception, as disclosed herein.

The content enhancer component can communicate the reconstructed video content and visual information relating to user-related interaction, and the reconstructed audio content, to the second communication device via a wireline or wireless communication connection. The second communication device can present (e.g., display, emit, project, etc.) the reconstructed video content and visual information relating to user-related interaction, and the reconstructed audio content, to the user via the display screen and audio system, respectively, of the second communication device.

Figure 7:
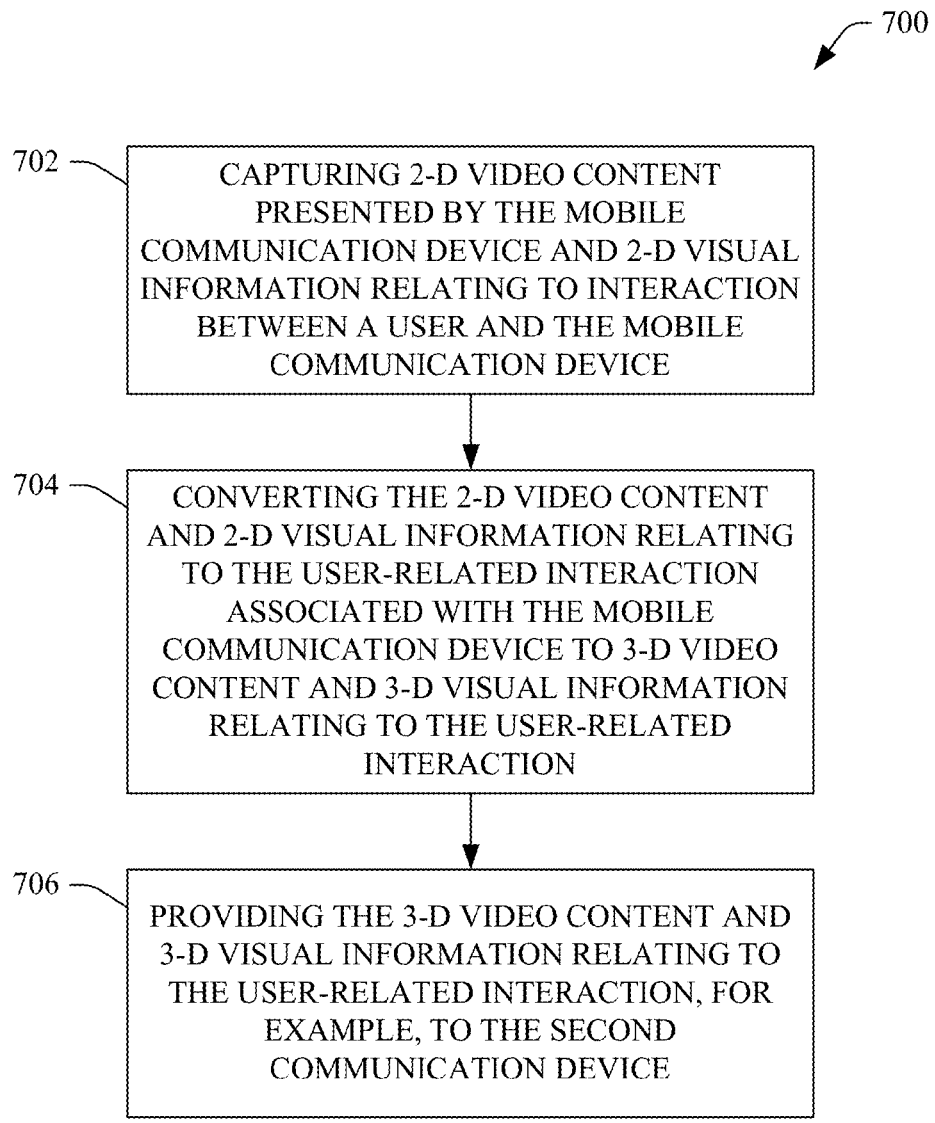
FIG. 7 depicts a flow diagram of an example method for converting captured 2-D video content and 2-D visual information relating to user interaction associated with a mobile communication device to 3-D video content and 3-D visual information relating to user-related interaction, to facilitate presenting reconstructed 3-D video content and 3-D visual information relating to user-related interaction on a second communication device, in accordance with various embodiments and aspects of the disclosed subject matter.

Turning to FIG. 7, depicted is a flow diagram of another example method 700 for converting captured 2-D video content and 2-D visual information relating to user interaction associated with a mobile communication device to 3-D video content and 3-D visual information relating to user-related interaction, to facilitate presenting reconstructed 3-D video content and 3-D visual information relating to user-related interaction on a second communication device, in accordance with various embodiments and aspects of the disclosed subject matter. At 702, 2-D video content presented by the mobile communication device and 2-D visual information relating to interaction between a user and the mobile communication device can be captured. While the mobile communication device is within or in proximity to a capture region of the content enhancer component, the content enhancer component can capture the 2-D video content presented by the mobile communication device and the 2-D visual information relating to user-related interaction associated with the mobile communication device, as more fully disclosed herein.

At 704, the 2-D video content and 2-D visual information relating to the user-related interaction associated with the mobile communication device can be converted to 3-D video content and 3-D visual information relating to the user-related interaction. The content enhancer component can convert the 2-D video content and 2-D visual information relating to the user-related interaction associated with the mobile communication device to generate 3-D video content and 3-D visual information relating to the user-related interaction, as more fully disclosed herein.

At 706, the 3-D video content and 3-D visual information relating to the user-related interaction can be provided, for example, to the second communication device. The content enhancer component can provide the 3-D video content and 3-D visual information relating to the user-related interaction to the second communication device for presentation by the second communication device.

Figure 8:
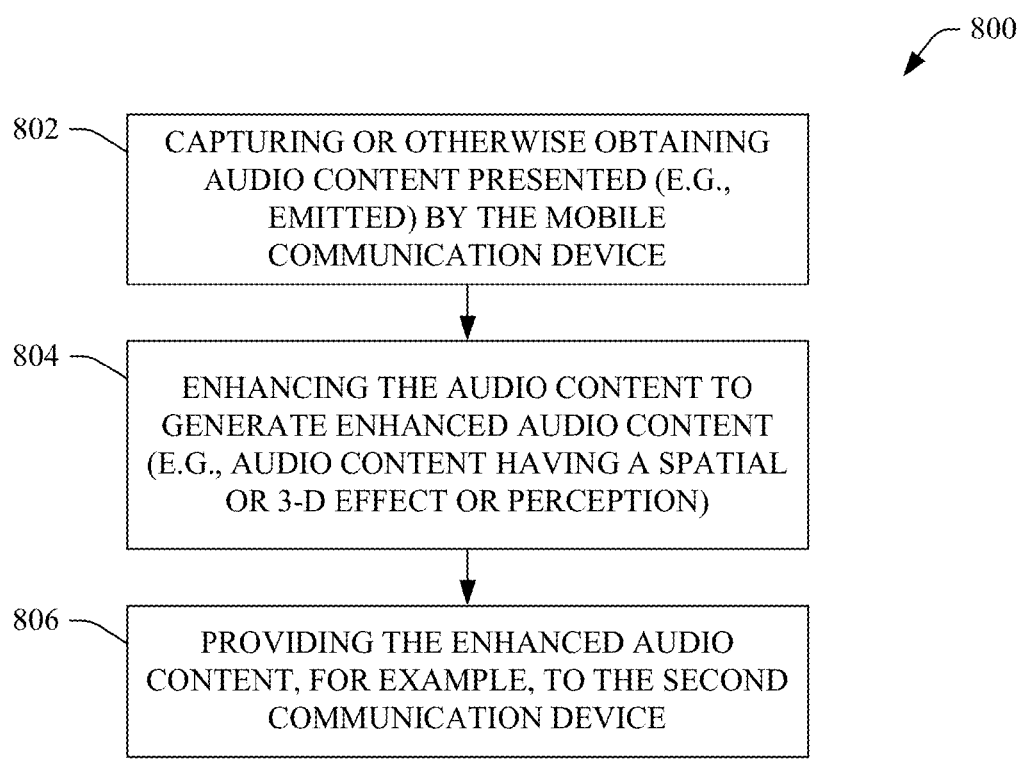
FIG. 8 illustrates a flow diagram of an example method for enhancing captured or obtained audio content associated with a mobile communication device to facilitate providing enhanced audio content for presentation by a second communication device, in accordance with various embodiments and aspects of the disclosed subject matter.

FIG. 8 illustrates a flow diagram of another example method 800 for enhancing captured or obtained audio content associated with a mobile communication device to facilitate providing enhanced audio content for presentation by a second communication device, in accordance with various embodiments and aspects of the disclosed subject matter. At 802, audio content presented (e.g., emitted) by the mobile communication device can be captured or obtained. While the mobile communication device is associated with (e.g., within or in proximity to a capture region of, or communicatively connected to) the content enhancer component, the content enhancer component can capture or obtain the audio content presented by the mobile communication device, as more fully disclosed herein.

At 804, the audio content can be enhanced to generate enhanced audio content. The content enhancer component can enhance the audio content to generate enhanced audio content, such as audio content enhanced to have a spatial effect and/or 3-D perception, as more fully disclosed herein.

At 806, the enhanced audio content can be provided, for example, to the second communication device. The content enhancer component can provide the enhanced audio content to the second communication device for presentation by the second communication device.

Figure 9:
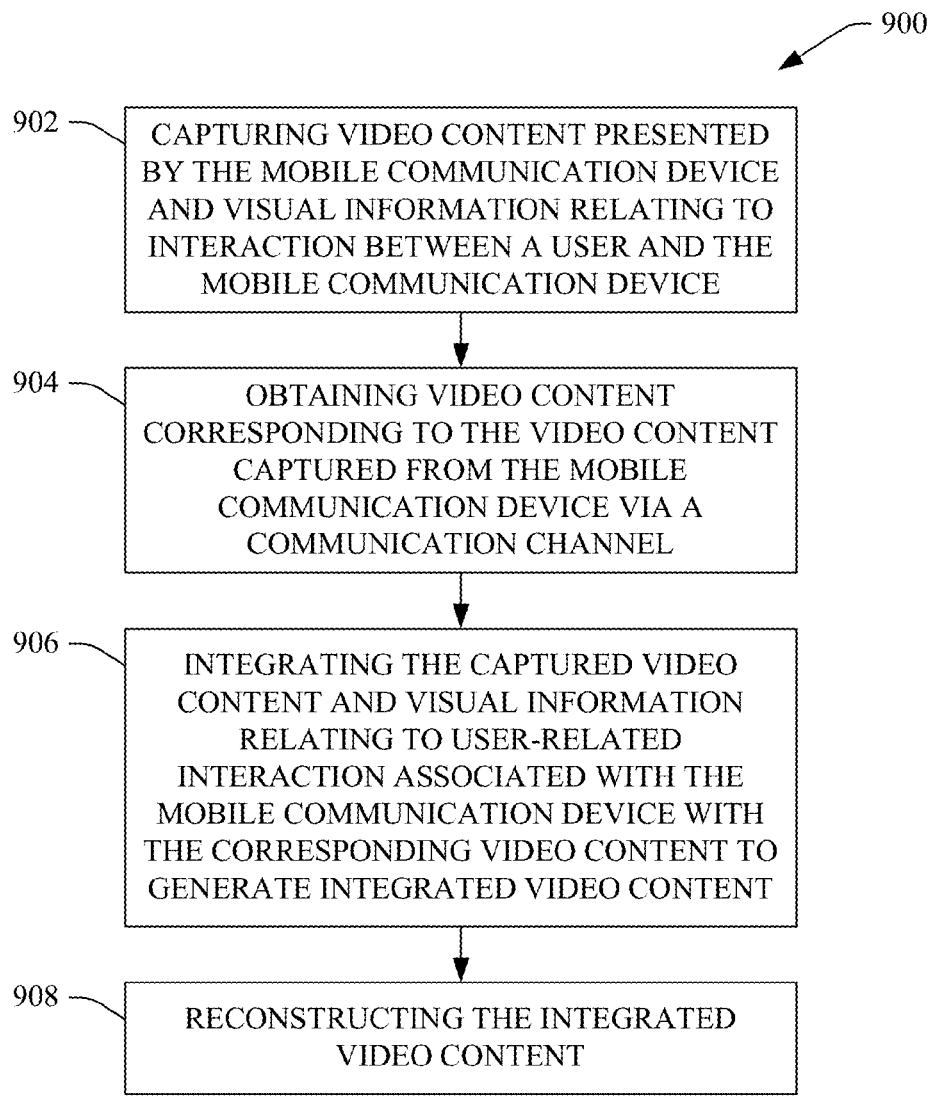
FIG. 9 illustrates a flow diagram of an example method for integrating captured video content and visual information relating to user-related interaction associated a mobile communication device with video content otherwise obtained from the mobile communication device, in accordance with various embodiments and aspects of the disclosed subject matter.

FIG. 9 illustrates a flow diagram of another example method 900 for integrating captured video content and visual information relating to user-related interaction associated a mobile communication device with video content otherwise obtained from the mobile communication device, in accordance with various embodiments and aspects of the disclosed subject matter. At 902, video content presented by the mobile communication device and visual information relating to interaction between a user and the mobile communication device can be captured. While the mobile communication device is within or in proximity to a capture region of the content enhancer component, the content enhancer component can capture the video content (e.g., 2-D video content) presented by the mobile communication device and the visual information relating to user-related interaction associated with the mobile communication device, as more fully disclosed herein.

At 904, video content corresponding to the video content captured from the mobile communication device can be obtained via a communication channel. The mobile communication device can be communicatively connected to the content enhancer component via a wireline or wireless channel. The content enhancer component can receive the video content from the mobile communication device via the communication channel, as more fully disclosed herein.

At 906, the captured video content and visual information relating to user-related interaction associated with the mobile communication device can be integrated with the corresponding video content to generate integrated video content. The content enhancer component can integrate the captured video content and the visual information relating to user-related interaction associated with the mobile communication device with the corresponding video content to generate integrated video content, as more fully disclosed herein. For example, the content enhancer component can determine that the integration of the captured video content and visual information relating to user-related interaction with the corresponding video content will result in integrated video content that has a visual quality that is sufficiently higher than the visual quality of the captured video content and visual information relating to user-related interaction without integration of the corresponding video content. In accordance with one or more defined content processing criterion and due in part to the sufficiently higher visual quality expected to be achieved by performing the integration process, the content enhancer can determine that the captured video content and visual information relating to user-related interaction associated with the mobile communication device is to be integrated with the corresponding video content to generate the integrated video content. The defined content processing criterion can relate to, for example, the difference in visual quality level of the resulting visual image with or without the integration process being performed, the amount of additional computational resources to be used to perform the integration process, the available amount of computational resources, the amount of additional time to be used to perform the integration process, the available amount of time, the amount of additional power to be used to perform the integration process, the available amount of power, and/or other factors or criterion.

At 908, the integrated video content can be reconstructed. The content enhancer component can reconstruct the integrated video content, and can provide the reconstructed video content to a second communication device.

The content enhancer component also can generate reconstructed audio content associated with the video content, and can provide the reconstructed audio content to the second communication device, wherein the content enhancer component can obtain (e.g., receive and/or capture) audio content from the mobile communication device, and process the obtained audio content, and reconstruct the audio content to generate the reconstructed audio content. The second communication device can present the reconstructed video content on its display screen, which can be larger than and/or have higher quality visual capabilities than, the display screen of the mobile communication device, and can present the reconstructed audio content via the audio system of the second communication device, wherein its audio system can have superior audio sound and features than that of the mobile communication device.

Figure 10:
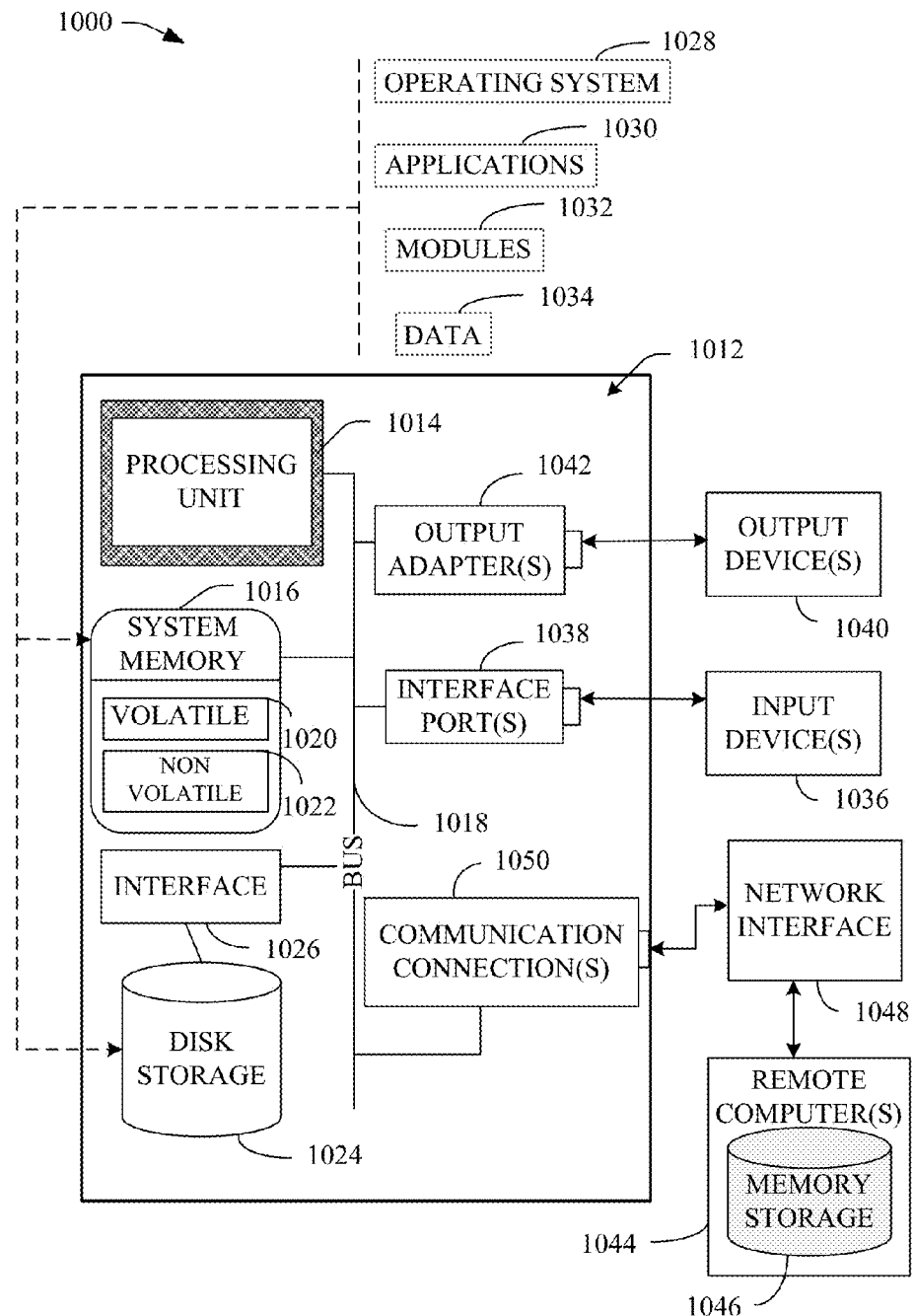
FIG. 10 is a schematic block diagram illustrating a suitable operating environment.
Figure 11:
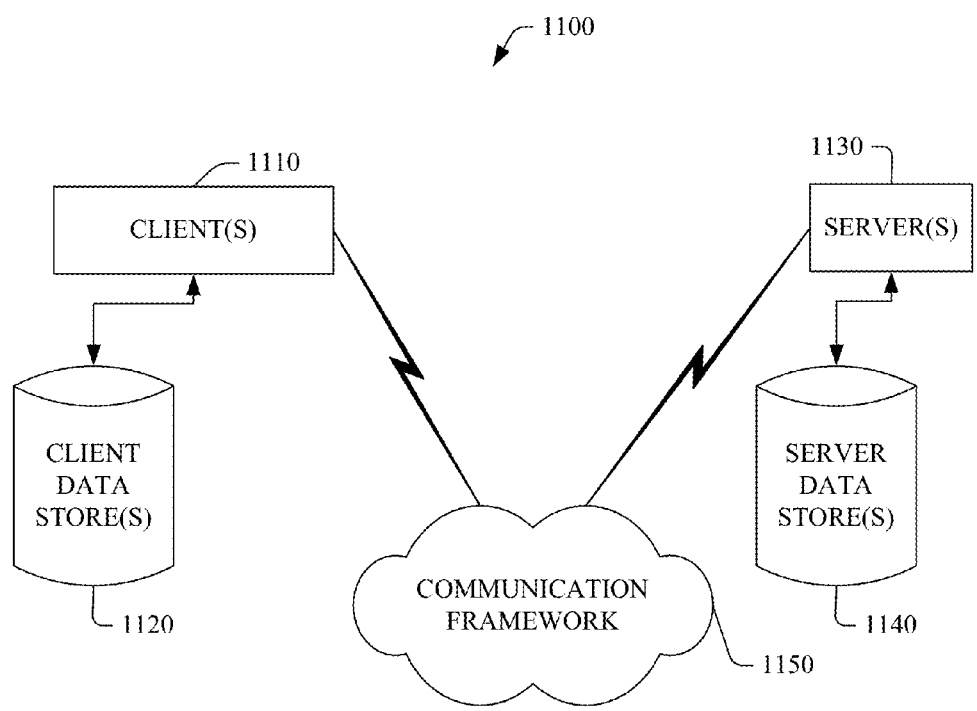
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented.

While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 10, a suitable environment 1000 for implementing various aspects of the claimed subject matter includes a computer 1012. The computer 1012 includes a processing unit 1014, a system memory 1016, and a system bus 1018. It is to be appreciated that the computer 1012 can be used in connection with implementing one or more of the systems or components (e.g., content enhancer component, capture component, etc.) shown and/or described in connection with, for example, FIGS. 1-5. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also can include removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026).

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the subject disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the subject disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client (s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be appreciated and understood that components (e.g., mobile communication device, second communication device, content enhancer component, capture component, etc.), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   a capture component, comprising one or more cameras, that captures video content presented by a first communication device and visual information relating to interaction between a user and the first communication device in relation to the video content; and
   a content enhancer component that receives corresponding video content relating to the video content from the first communication device, and determines a visual process to apply to the video content, the corresponding video content, and the visual information, based in part on a result of a comparison of a first visual quality of the video content to a second visual quality of the corresponding video content, to facilitate generation of integrated reconstructed video content, wherein, based in part on the visual process, and based in part on a result of the comparison indicating that the first visual quality of the video content is a lower visual quality than the second visual quality of the corresponding video content, the content enhancer component masks a portion of the video content that does not involve the interaction between the user and the first communication device in relation to the video content to remove the portion of the video content, replaces the portion of the video content with a portion of the corresponding video content that corresponds to the portion of the video content, and reconstructs the portion of the corresponding video content and reconstructs the visual information to generate the integrated reconstructed video content comprising reconstructed corresponding video content and reconstructed visual information relating to the interaction between the user and the first communication device, to facilitate presentation of the integrated reconstructed video content by a second communication device.

2. The system of claim 1, wherein the capture component captures the video content and the visual information while the first communication device is within or in proximity to a capture region of the content enhancer component.

3. The system of claim 1, wherein the capture component further comprises one or more microphones that capture audio content associated with the first communication device while the first communication device is within or in proximity to a capture region of the content enhancer component, wherein the audio content is associated with the video content or is not associated with the video content.

4. The system of claim 3, wherein the content enhancer component enhances the audio content to generate enhanced audio content comprising a spatial effect to facilitate presentation of the enhanced audio content by the second communication device.

5. The system of claim 1, wherein the video content is two-dimensional video content, and the content enhancer component enhances the two-dimensional video content to convert the two-dimensional video content to three-dimensional video content that is reconstructed to generate reconstructed three-dimensional video content to facilitate display of the reconstructed three-dimensional video content on a three-dimensional display of the second communication device.

6. The system of claim 1, wherein the content enhancer component receives the corresponding video content relating to the video content presented by the first communication device via a communication channel between the content enhancer component and the first communication device.

7. The system of claim 6, wherein the content enhancer component determines whether to integrate the portion of the video content with the portion of the corresponding video content, based in part on the result of the comparison of the first visual quality of the portion of the video content with the second visual quality of the portion of the corresponding video content, to facilitate the generation of the integrated reconstructed video content.

8. The system of claim 7, wherein the content enhancer component integrates the portion of the video content with the portion of the corresponding video content to facilitate the generation of the integrated reconstructed video content in response to a determination that the second visual quality of the portion of the corresponding video content is higher than the first visual quality of the portion of the video content by a defined level of visual quality.

9. The system of claim 8, wherein the integration of the portion of the video content with the portion of the corresponding video content facilitates generation of the integrated reconstructed video content that has a higher visual quality than the first visual quality of the portion of the video content.

10. A method, comprising:
capturing, by a system comprising a processor, video content provided by a mobile communication device and visual information relating to interaction between a user and the mobile communication device in relation to the video content;
receiving, by the system, corresponding video content that substantially corresponds to the video content from the mobile communication device;
determining, by the system, a visual process to apply to the video content, the corresponding video content, and the visual information, based in part on a result of a comparison of a first visual quality of the video content to a second visual quality of the corresponding video content, to facilitate generating integrated reconstructed video content;
in response to determining the visual process to apply to the video content, the corresponding video content, and based in part on the result of the comparison indicating that the first visual quality of the video content is a lower visual quality than the second visual quality of the corresponding video content,
  masking, by the system, a portion of the video content that does not involve the interaction between the user and the mobile communication device in relation to the video content, and
  replacing, by the system, the portion of the video content with a portion of the corresponding video content that substantially corresponds to the portion of the video content; and
based in part on the visual process, reconstructing, by the system, the corresponding video content and the visual information to generate the integrated reconstructed video content, comprising reconstructed corresponding video content and reconstructed visual information relating to the interaction between the user and the mobile communication device, to facilitate providing the integrated reconstructed video content to a different communication device.

11. The method of claim 10, wherein the capturing further comprises capturing the video content and the visual information while the mobile communication device is within or in proximity to a capture region associated with one or more video cameras.

12. The method of claim 10, further comprising:
capturing, by the system, audio content associated with the mobile communication device while the mobile communication device is within or in proximity to a capture region associated with one or more microphones, wherein the audio content is associated with the video content or is not associated with the video content.

13. The method of claim 12, further comprising:
converting, by the system, the audio content to generate enhanced audio content comprising a three-dimensional spatial effect to facilitate presenting of the enhanced audio content by the second communication device.

14. The method of claim 10, wherein the video content is two-dimensional video content and the corresponding video content is two-dimensional corresponding video content, the method further comprising:
converting, by the system, one of the two-dimensional video content or the two-dimensional corresponding video content to three-dimensional video content based in part on a defined content processing algorithm; and
reconstructing, by the system, the three-dimensional content to generate reconstructed three-dimensional video content to facilitate displaying of the reconstructed three-dimensional video content on a three-dimensional display of the second communication device.

15. The method of claim 10, wherein the visual information relating to the interaction between the user and the mobile communication device in relation to the video content comprises a subset of the visual information relating to manipulation of a button on the mobile communication device in relation to the video content.

16. The method of claim 10, further comprising:
determining, by the system, whether to integrate another portion of the video content with another portion of the corresponding video content, based in part on the result of the comparison of the first visual quality of the video content with the second visual quality of the corresponding video content, to facilitate generating the integrated reconstructed video content.

17. The method of claim 16, further comprising:
in response to determining that the second visual quality of the corresponding video content is higher than the first visual quality of the video content by a defined level of visual quality, integrating, by the system, the other portion of the video content with the other portion of the corresponding video content to facilitate the generating of the integrated reconstructed video content, wherein the other portion of the corresponding video content is integrated with the other portion of the video content to have the other portion of the corresponding video content visually predominate over the other portion of the video content.

18. A non-transitory computer readable storage medium comprising computer executable instructions that, in response to execution, cause a system comprising a processor to perform operations, comprising:
obtaining video content provided by a first communication device, corresponding video content that substantially corresponds to the video content, and visual information relating to interaction between a user and the first communication device in relation to the video content;
determining a visual process to apply to the video content, the corresponding video content, and the visual information, based in part on a result of a comparison of a first visual quality of the video content to a second visual quality of the corresponding video content, to facilitate generating integrated reconstructed video content;
in response to determining the visual process to apply to the video content, the corresponding video content, and the visual information, and based in part on the result of the comparison indicating that the first visual quality of the video content is a lower visual quality than the second visual quality of the corresponding video content, masking a portion of the video content that does not include the interaction between the user and the first communication device in relation to the video content, and replacing the portion of the video content with a portion of the corresponding video content that corresponds to the portion of the video content; and based in part on the visual process, reconstructing the corresponding video content and the visual information to generate the integrated reconstructed video content, comprising reconstructed corresponding video content and reconstructed visual information relating to the interaction between the user and the first communication device, to facilitate providing the integrated reconstructed video content to a second communication device.

19. The non-transitory computer readable storage medium of claim 18, wherein the operations further comprise:

capturing the video content and the visual information using a camera while the first communication device is within or in proximity to a capture region associated with the camera.

20. The non-transitory computer readable storage medium of claim 18, wherein the operations further comprise:

capturing audio content associated with the first communication device using one or more microphones while the first communication device is within or in proximity to a capture region associated with the one or more microphones, wherein the audio content is associated with the video content.

21. A system, comprising:

means for capturing video content provided by a mobile communication device and visual information relating to interaction between a user and the mobile communication device in relation to the video content;

means for receiving corresponding video content relating to the video content from the mobile communication device;

means for determining a visual process to apply to the video content, the corresponding video content, and the visual information, based at least in part on a result of a comparison of a first visual quality of the video content to a second visual quality of the corresponding video content, to facilitate generating integrated reconstructed video content;

means for masking a portion of the video content that does not involve the interaction between the user and the mobile communication device in relation to the video content, in response to determining the visual process to apply to the video content, the corresponding video content, and the visual information, and based in part on the result of the comparison indicating that the first visual quality of the video content is a lower visual quality than the second visual quality of the corresponding video content;

means for replacing the portion of the video content with a portion of the corresponding video content that corresponds to the portion of the video content based in part on the masking of the portion of the video content; and means for reconstructing the corresponding video content and the visual information, based in part on the visual process, to generate the integrated reconstructed video content, comprising reconstructed corresponding video content and reconstructed visual information relating to the interaction between the user and the mobile communication device, to facilitate providing the integrated reconstructed video content to a different communication device.

22. The system of claim 21, further comprising:

means for capturing audio content associated with the mobile communication device while the mobile communication device is within or in proximity to a capture region associated with the means for capturing the audio content, wherein the audio content is associated with the video content or is not associated with the video content; and means for reconstructing the audio content to generate reconstructed audio content to facilitate providing the reconstructed audio content to the different communication device.

\* \* \* \* \*